United States Patent
Medeiros et al.

(10) Patent No.: US 12,430,038 B1
(45) Date of Patent: Sep. 30, 2025

(54) AUTOMATED POWER LIMIT WRITE PACING TO CONTROL NAND ENDURANCE

(71) Applicant: Dell Products L.P., Round Rock, TX (US)

(72) Inventors: Earl Medeiros, Fall River, MA (US); Ramesh Doddaiah, Westborough, MA (US); Adnan Sahin, Needham, MA (US)

(73) Assignee: Dell Products L.P., Round Rock, TX (US)

( * ) Notice: Subject to any disclaimer, the term of this patent is extended or adjusted under 35 U.S.C. 154(b) by 41 days.

(21) Appl. No.: 18/619,541

(22) Filed: Mar. 28, 2024

(51) Int. Cl.
*G06F 3/06* (2006.01)

(52) U.S. Cl.
CPC .......... *G06F 3/0616* (2013.01); *G06F 3/0634* (2013.01); *G06F 3/0679* (2013.01)

(58) Field of Classification Search
CPC ..... G06F 3/0616; G06F 3/0634; G06F 3/0679
See application file for complete search history.

(56) References Cited

U.S. PATENT DOCUMENTS

| | | | | |
|---|---|---|---|---|
| 7,778,077 B2* | 8/2010 | Gorobets | ........... | G11C 16/3495 365/185.11 |
| 2007/0263444 A1* | 11/2007 | Gorobets | ............. | G11C 16/349 365/185.09 |
| 2019/0253518 A1* | 8/2019 | Nachimuthu | ....... | H04L 43/0817 |
| 2020/0401514 A1* | 12/2020 | Liang | .................. | G06F 12/0253 |

* cited by examiner

Primary Examiner — Jane W Benner
(74) Attorney, Agent, or Firm — Daly, Crowley, Mofford & Durkee, LLP

(57) ABSTRACT

A method is provided, comprising: obtaining a current wear metric value that is associated with at least one storage device; obtaining an expected wear metric value that corresponds to the current wear metric value; comparing the current wear metric value to the expected wear metric value; and decreasing a maximum power consumption limit of the storage device from a current level to a first level that is lower than the current level, the maximum power consumption limit of the storage device being decreased in response to detecting that the current wear metric value exceeds the expected wear metric value by a first predetermined amount.

20 Claims, 7 Drawing Sheets

| REMAINING % LIFE | TIME INSTANT |
|---|---|
| 100 | TIME_1 |
| 99% | TIME_2 |
| 98% | TIME_3 |
| 0% | TIME_N |

AUTOMATED POWER LIMIT WRITE PACING TO CONTROL NAND ENDURANCE

BACKGROUND

A distributed storage system may include a plurality of storage devices (e.g., storage arrays) to provide data storage to a plurality of nodes. The plurality of storage devices and the plurality of nodes may be situated in the same physical location, or in one or more physically remote locations. The plurality of nodes may be coupled to the storage devices by a high-speed interconnect, such as a switch fabric.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to aspects of the disclosure, a method is provided, comprising: obtaining a current wear metric value that is associated with at least one storage device; obtaining an expected wear metric value that corresponds to the current wear metric value; comparing the current wear metric value to the expected wear metric value; and decreasing a maximum power consumption limit of the storage device from a current level to a first level that is lower than the current level, the maximum power consumption limit of the storage device being decreased in response to detecting that the current wear metric value exceeds the expected wear metric value by a first predetermined amount.

According to aspects of the disclosure, a system is provided, comprising: a memory; and at least one processor that is operatively coupled to the memory, the at least one processor being further configured to perform the operations of: obtaining a current wear metric value that is associated with at least one storage device; obtaining an expected wear metric value that corresponds to the current wear metric value; comparing the current wear metric value to the expected wear metric value; and decreasing a maximum power consumption limit of the storage device from a current level to a first level that is lower than the current level, the maximum power consumption limit of the storage device being decreased in response to detecting that the current wear metric value exceeds the expected wear metric value by a first predetermined amount.

According to aspects of the disclosure, a non-transitory computer readable medium storing one or more processor-executable instructions, which when executed by at least one processor, cause the at least one processor to perform the operations of: obtaining a current wear metric value that is associated with at least one storage device; obtaining an expected wear metric value that corresponds to the current wear metric value; comparing the current wear metric value to the expected wear metric value; and decreasing a maximum power consumption limit of the storage device from a current level to a first level that is lower than the current level, the maximum power consumption limit of the storage device being decreased in response to detecting that the current wear metric value exceeds the expected wear metric value by a first predetermined amount.

BRIEF DESCRIPTION OF THE DRAWING FIGURES

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features.

DETAILED DESCRIPTION

Figure 1:
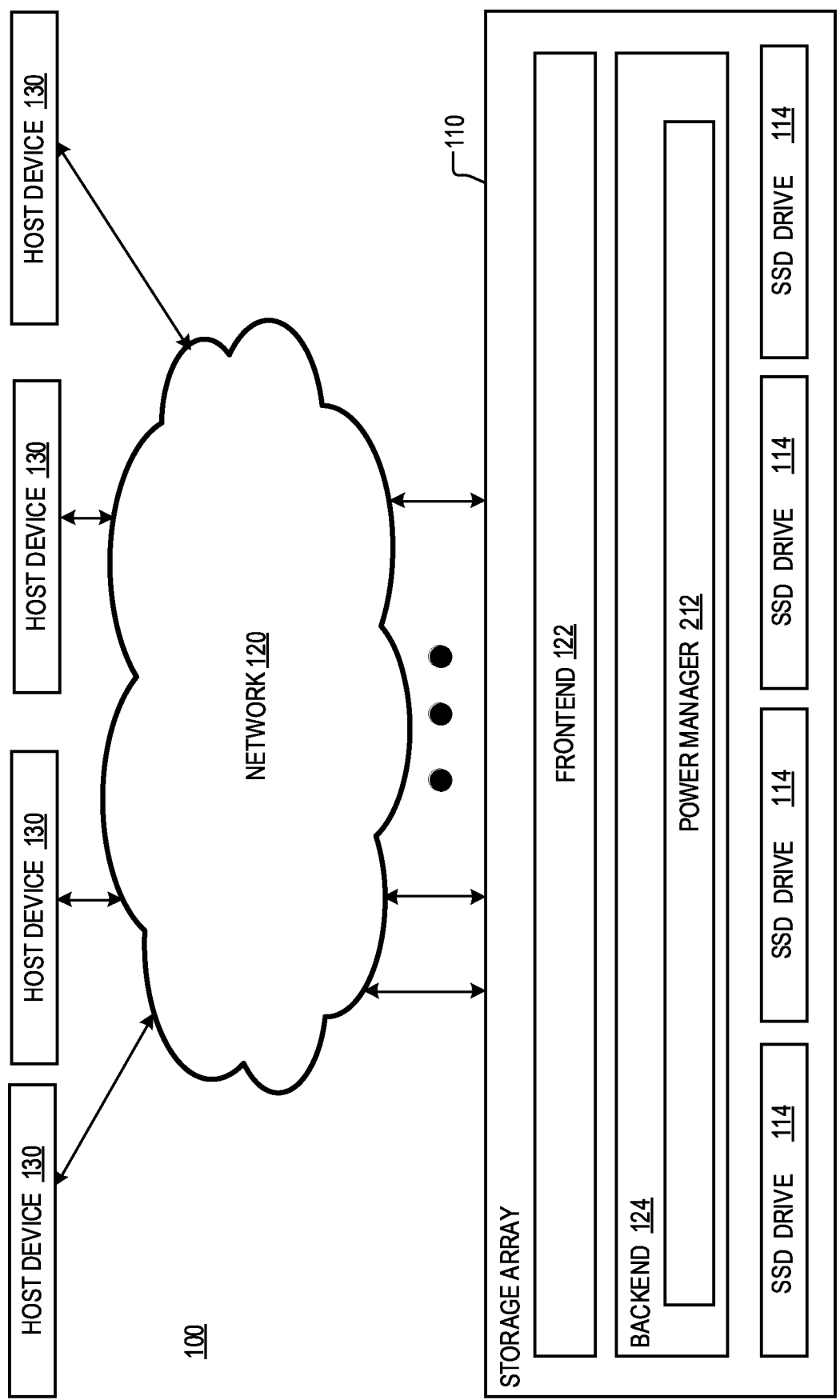
FIG. 1 is a diagram of an example of a system, according to aspects of the disclosure.

FIG. 1 is a diagram of an example of a system 100, according to aspects of the disclosure. As illustrated, the system 100 may include a storage array 110, a communications network 120, and a plurality of host devices 130. The communications network 120 may include one or more of a fibre channel (FC) network, the Internet, a local area network (LAN), a wide area network (WAN), and/or any other suitable type of network. The storage array 110 may include a storage system, such as DELL/EMC Powermax™, DELL PowerStore™, and/or any other suitable type of storage system. The storage array 110 may include a plurality of storage devices 114 and a plurality of storage processors, such as the computing device 200, which is discussed further below with respect to FIG. 2. Each of the storage processors may be configured to receive I/O requests from host devices 130 and execute the received I/O requests by reading and/or writing data to storage devices 114. Together, the storage processors may implement a frontend 122 and a backend 124 of the storage array 110. The frontend 122 may be responsible for caching data associated with incoming write requests and the backend 124 may be responsible for destaging the data from the cache into the storage devices 114. In addition, the backend 124 may be responsible for loading, into the cache, data associated with incoming read requests, and the frontend 122 may be responsible for returning the cached data to the senders of the read requests. The frontend 122 and backend 124 may be implemented as various services (or kernel components) of the storage processors in storage array 110.

Each of the storage devices 114 may include a solid-state drive (SSD). In some implementations, the storage devices may constitute a Redundant Array of Independent Disks (RAID) group. In some implementations, each of the storage devices may include a NAND flash memory device. Each of the storage devices 114 may include a respective plurality of memory cells. According to the present example, the memory cells are Quad-Level Cells (QLCs), and the storage devices are QLC NAND storage devices. However, alternative implementations are possible in which any of the storage devices is a Single Level Cell (SLC) storage device, a Multi-level cell (MLC) flash storage device, a Tripple-level cell (TLC) flash storage device, or a Penta-level cell (PLC) device. It will be understood that the present disclosure is not limited to any specific implementation of the storage devices 114. According to the present example, the storage devices are Non-Volatile Memory Express (NVME) devices that are connected to the storage processors in storage array 110 via a PCI Express interface. However, alternative implementations are possible in which the storage devices use a different type of interface, such as serial attached SCSI (SAS). Stated succinctly, the present disclosure is not limited to the storage devices 114 using any specific interface.

SLC, MLC, TLC, QLC, and PLC differ in the amount of data they can store per memory cell. SLC devices can store one bit of data in each memory cell. MLC devices can store two bits in each of their memory cells. TLC devices can store three bits in each of their memory cells. QLC devices can store four bits in each of their memory cells. PLC devices can store five bits in each of their memory cells. In other words, QLC and PLC storage devices have the largest storage density and the lowest production cost per gigabyte. This makes the use of PLC and QLC storage devices highly desirable in storage arrays, such as the storage array 110.

One disadvantage that QLC and PLC storage devices have over SLC, MLC, and TLC storage devices is that they are less durable. For example, an SLC storage device may endure tens of thousands to hundreds of thousands of program erase (P/E) cycles. An MLC device may have an endurance in the range of tens of thousands P/E cycles. A TLC device may have an endurance in the range of a few thousand to tens of thousands P/E cycles. And a QLC device may have endurance in the range of hundreds to a couple of thousand P/E cycles, while a PLC device may have an even lower endurance.

Storage devices, such as the storage devices 114, may have a built-in Self-Monitoring, Analysis, and Reporting Technology (S.M.A.R.T.). This technology allows each of the storage devices to report various wear metrics. For example, a storage device may report metrics such as a wear leveling count, a media wear-out indicator, a wear range delta, or host writes. The wear leveling count may indicate the number of P/E cycles that a storage device 114 has undergone. The media wear-out indicator, often referred to as percentage life used (or remaining percent life) provides an estimation of the percentage of the lifespan of the drive that has been used. The wear range delta indicator reports the normalized wear leveling count over the entire lifespan of a storage device and provides information about the wear leveling efficiency. The host writes indicator represents the total number of write commands that have been issued to the storage device. As used throughout the disclosure, the term "wear metric of a storage device" may refer to one or more of: (i) the average count of P/E cycles that are experienced by the memory cells in the storage device, (ii) the count of P/E cycles that is experienced by the memory cell in the storage device which has undergone the highest number of P/E cycles compared to other memory cells in the same storage device, (iii) any indicator that is at least in part indicative of the average count of P/E cycles that are experienced by the memory cells in the storage device, (iv) any indicator that is at least in part indicative of the count of P/E cycles that is experienced by the memory cell in the storage device which has undergone the highest number of P/E cycles compared to other memory cells in the same storage device, and/or (v) any indicator that is at least in part indicative of the amount of life that the storage device has left. Although, in the present example, S.M.A.R.T. is used to wear metrics for storage devices 114, the present disclosure is not limited to any specific method for obtaining a wear metric for any of the storage devices.

Storage devices, such as the storage devices 114, may have a built-in controller and a built-in power management system. The controller and built-in power management system may allow the user (or one of the storage processors in storage array 110) to set the maximum power that is used by the storage device. Specifically, the user (or storage processor) may provide the storage device with a descriptor that identifies: (i) the maximum power consumption limit of the storage device during operating mode (or during startup) and/or (ii) the +12V supply current that corresponds to the maximum power used. Conventionally, the power management features of storage devices are used for power budgeting purposes to ensure that the total amount of power that is drawn by the PCI express devices in the system does not exceed the maximum that is allowed by the system's board. The maximum power consumption limit of a storage device is the maximum amount of power that the storage device is configured to draw (or limited to) by the built-in power management system of the storage device.

The NVME specification defines a power state descriptor data structure that includes a maximum power (MP) power field. This field indicates the sustained maximum power consumed by a storage device (i.e. it indicates the maximum power consumption limit of the storage device). According to the NVME specification, the power in Watts is equal to the value in this field multiplied by the scale specified in the Max Power Scale bit of the same descriptor. As noted above, according to the example of FIG. 1, each of the storage devices 114 is an NVME storage device. In this regard, the maximum power consumption limit of any of the storage devices 114 may be specified by using the NVME power state descriptor. However, it will be understood that the present disclosure is not limited to any specific method for specifying the maximum power consumption limit of the storage devices.

The backend 124 may include a power manager. The power manager may be executed on one or more of the storage processors in storage array 110 and/or on any other computing device that is part of the storage array 110. In some implementations, the power manager 212 may include one or more processes, and it may be implemented as a service or a kernel component. The power manager 212 may be configured to implement a power limit throttling mechanism that is intended to pace the write I/Os that are executed by the storage devices 114. In some implementations, the power throttling mechanism may be implemented in accordance with the process 300, which is discussed further below with respect to FIG. 3. The power throttling approach is advantageous over conventional approaches to pacing write I/Os because it scales as NAND devices are added to a storage array, it does not require the use of software tracking device parameters, like I/O bocks written, to pace write I/Os. Moreover, the power throttling mechanism is relatively simple to implement in software and does not require a large code overhaul or costly software intervention. Moreover, the power throttling mechanism can be used to improve data center sustainability metrics.

Examples are now provided of some conventional approaches for pacing the writes that are executed by the storage devices in a storage array. One such approach involves simply increasing the number of storage devices in the storage array and scattering the writes over the increased number of storage devices. However, a disadvantage of this approach in comparison to the throttling mechanism is that it is more costly. Another approach involves short-stroking QLC NAND storage devices, which reduces wear-out by increasing the free blocks that are available. However, unlike the proposed throttling mechanism, this approach comes at the expense of available storage capacity, which is costly. Yet another approach involves blindly inserting storage system front-end IO delay to QLC NAND Storage Groups. However, this approach defeats the purpose of having a low-latency cache. Furthermore, host-side throttling can be short-circuited by other internal operations that generate write IOs to drives like local replication, remote replication, rebuild, garbage collection etc.

Figures 2A, 2B:
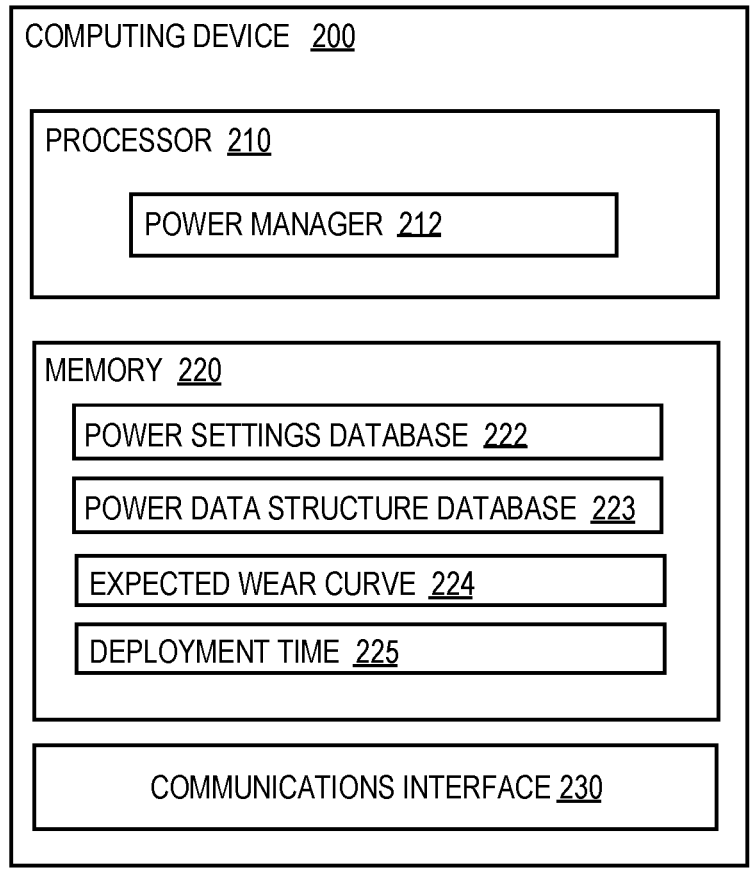
FIG. 2A is a diagram of an example of a computing device, according to aspects of the disclosure.
FIG. 2B is a diagram of an example of an expected wear curve, according to aspects of the disclosure.

FIG. 2A is a diagram of an example of a computing device, 200 according to aspects of the disclosure. The computing device 200 may be a storage processor and/or any other node in storage array 110. As illustrated, the computing device 200 may include a processor 210, a memory 220, and a communications interface 230. Memory 220 may include one or more of a random-access memory (RAM), a dynamic random memory (DRAM), a flash memory, a hard drive (HD), a solid-state drive (SSD), a network-accessible storage (NAS), and or any other suitable type of memory device. The processor 210 may include any of one or more general-purpose processors (e.g., x86 processors, RISC processors, ARM-based processors, etc.), one or more Field Programmable Gate Arrays (FPGAs), one or more application-specific circuits (ASICs), and/or any other suitable type of processing circuitry. The communications interface 230 may include any suitable type of communications interface, such as one or more Ethernet adapters, one or more InfiniBand adapters, one or more Wi-Fi adapters (e.g., 802.1414 adapters), and one or more Long-Term Evolution (LTE) adapters, for example.

The processor 210 may be configured to execute the power manager 212. Although, in the present example, the power manager 212 is implemented in software, alternative implementations are possible in which the power manager 212 is implemented in hardware or as a combination of hardware and software. The memory 220 may be configured to store a power settings database 222, a power data structure database 223, and an expected wear curve 224. Database 223 may store a plurality of power data structures and provide a different respective power limit index for each of the data structures. Each of the data structures may specify a different power consumption limit value. The power settings database 222 may identify the power limit index of the power data structure that is currently used to set the maximum power consumption of at least one of the storage devices 114. For example, if the power settings database 222 includes the power limit index of '5', the processor 210 may retrieve the power limit index of '5' from the database 222. Next, processor 210 may retrieve, from database 223, the power data structure that is mapped to power limit index of '5'. And finally, processor 210 may use the retrieved power data structure to determine the current power consumption limit of the storage device 114.

Furthermore, memory 220 may store a deployment time 225. Deployment time 225 may be a number that indicates the time when storage devices 114 were first deployed (or when they started to be used to store and retrieve data). Deployment time may be a Unix timestamp. The present example assumes that all storage devices 114 have the same deployment time, but alternative implementations are possible in which a different respective deployment time indicator is provided for each of the storage devices 114.

Figure 4:
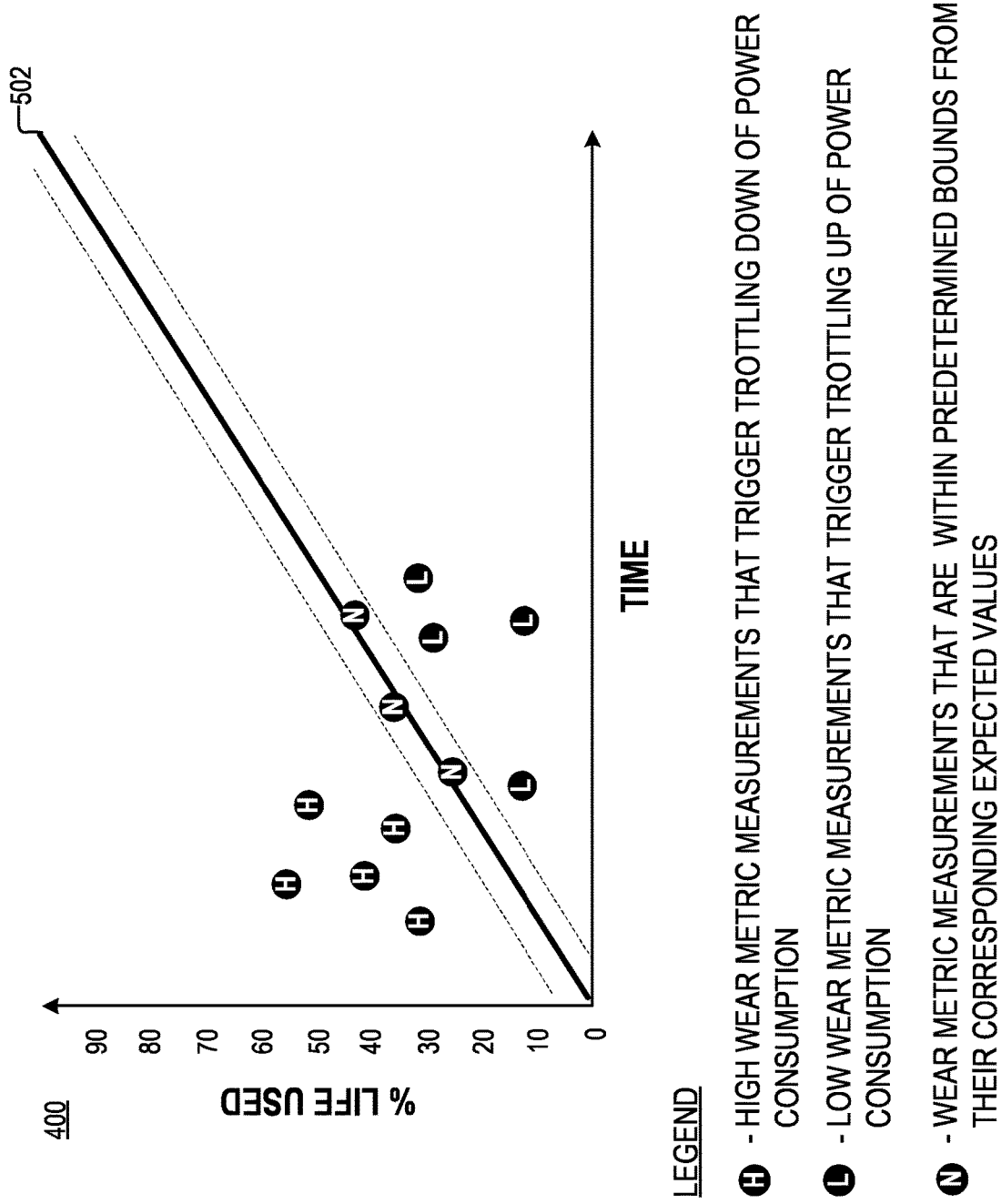
FIG. 4 is a graph illustrating aspects of the operation of the computing device of FIG. 2A, according to aspects of the disclosure.

FIG. 2B is a diagram of the expected wear curve 224, according to aspects of the disclosure. As illustrated, the curve 224 includes a plurality of entries 231. Each entry 231 includes a time instant identifier (e.g., Unix timestamp value) and the respective value of remaining percent life that corresponds to the time instant identifier. The curve 224 may be a tabular representation of the curve 502, which is shown in FIG. 4.

The curve 224 models the remaining percent life any of storage devices 114 should have at any instant of its operation if the storage device were to last for the entire period that is warranted (or otherwise promised) by the manufacturer. For example, if a manufacturer has indicated that any of storage devices 114 should remain operational (i.e., should not experience a failure) for five years, the time instant identified in the first entry in curve 224 would be the time when the storage device is deployed, and the time instant identified in the last entry would be five years from the time in the first instant. In one example, the curve may be generated by identifying the total count N 1-munite periods that are present in a-year period, finding a value M=100/N, where 100 is the percent life remaining of the storage device at the beginning of its operation, and generating a different entry 231 for each one minute period of the life of the storage device. The value Y of the percent life remaining in each of the entry 231 may be equal to 100-Z*M, where Z is the value of the time instant that is stored in the entry 231. Stated succinctly, curve 224 may be used to determine the percentage life remaining of a storage device 114, if the storage device 114 were used in line with the manufacturer's expectations—i.e., if the storage device were worn out at a rate that is neither greater nor smaller than the rate expected by the manufacturer.

Although, in the present example, the wear curve 224 maps remaining percent life to time, alternative implementations are possible in which any other suitable type of wear metric is mapped to time. As noted above, a non-limiting example of possible wear metrics that can be used for curve 224 includes wear range delta, host writes, or wear indicator life. It will be understood that the present disclosure is not limited to any specific wear metric being modeled by curve 224. For case of description, curve 224 is implemented as a table. However, alternative implementations are possible in which curve 224 is implemented by using an equation or any other suitable format. In the present example, curve 224 divides the life of a storage device into 1-minute periods and provides the expected wear the storage device is expected to have at the beginning (or end) of each of these periods. However, in alternative implementations, curve 224 may divide the life of the storage device into periods having a different duration (e.g., 5 minutes). Stated succinctly, the present disclosure is not limited to any specific implementation of the wear curve 224.

Figure 2C:
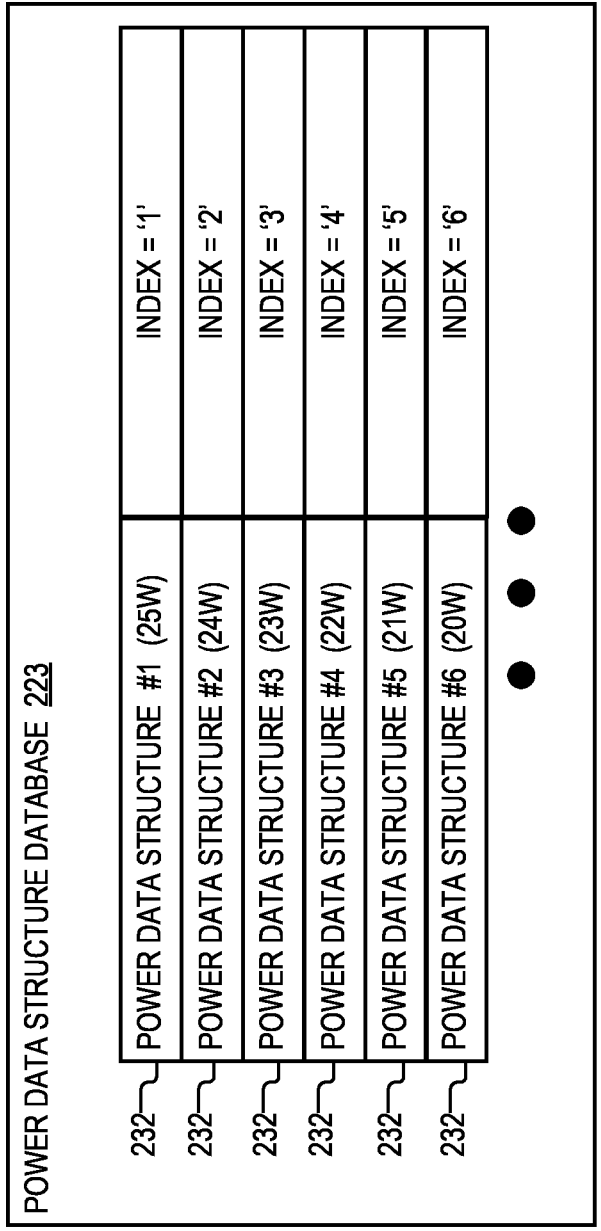
FIG. 2C is a diagram of an example of a power data structure database, according to aspects of the disclosure.

FIG. 2C shows an example of the power data structure database 223, according to aspects of the disclosure. As illustrated, the database 223 may include a plurality of entries 232. Each entry 232 may include a different respective power data structure and a corresponding power limit index for that data structure. Each of the power data structures in database 223 may have a different power limit index, which uniquely distinguishes that data structure. According to the present example, the power data structures are enumerated 1 through 6. Power data structure #1 provides that a storage device should have a maximum power consumption limit of 25 W when in normal operating mode; power data structure #2 provides that the storage device should have a maximum power consumption limit of 24 W when in normal operating mode; power data structure #3 provides that the storage device should have a maximum power consumption limit of 23 W when in normal operating mode; power data structure #4 provides that the storage device should have a maximum power consumption limit of 22 W when in normal operating mode; power data structure #5 provides that the storage device should have a maximum power consumption limit of 21 W when in normal operating mode; and power data structure #6 provides that the storage device should have maximum power consumption limit of 20 W when in normal operating mode.

The maximum power consumption limit of a storage device, that is specified by the power data structures in database 223, is the maximum power that should be consumed by the storage device during its operation, and it may be enforced by power management circuitry that is part of the storage device. In the present example, database 223 includes 6 power data structures that specify maximum power consumption limits in increments of 1 W. However, in alternative implementations, database 223 may include 14 data structures that specify maximum power settings in increments of 1 W, starting at 25 W and ending at 12 W.

According to the present example, the maximum power consumption limits that are specified by the power data structures are examples of power limit settings which a storage device could have when the storage device is in operating mode. However, in some implementations, each of the power data structures may provide a first maximum power consumption limit for when a storage device is in operating mode and a second maximum power consumption limit the storage device should have when the storage device is starting up. In some implementations, as a group, the power data structures in database 223 may provide that a storage device should have a fixed power consumption limit of 25 W when the storage device is starting up, and a variable power consumption limit during normal operation (i.e., after the storage device has finished starting up). The variable power consumption limit may be set in accordance with the process 300, which is discussed further below with respect to FIG. 3. Alternatively, in some implementations, as a group, the power data structures in database 223 may provide that a storage device should have a variable power consumption limit of 25 W when the storage device is starting up.

Figure 2D:
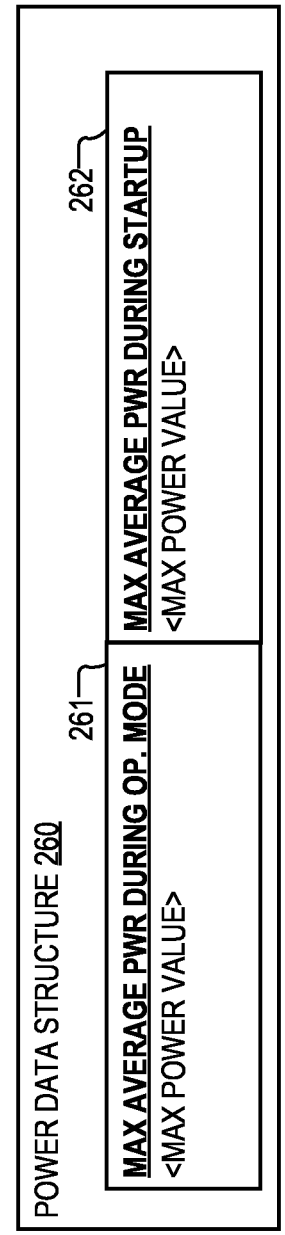
FIG. 2D is a diagram of an example of a power data structure, according to aspects of the disclosure.

FIG. 2D is a diagram of an example of a power data structure 260, according to aspects of the disclosure. The power data structure may be the same or similar to any of the power data structures in the database 223. The power data structure may include a power setting 261 and a power setting 262. The power setting 261 may include one or more numbers, strings, or alphanumerical strings that specify a maximum power consumption limit for a storage device (or a group of storage devices) when the storage device (or group) is in normal operating mode. The power setting 262 may include one or more numbers, strings, or alphanumerical strings that specify a maximum power consumption limit for a storage device (or group of storage devices) when the storage device (or system of which the storage device is part) is starting up. FIG. 2D is provided as an example only. In some implementations, setting 262 may be omitted. Additionally or alternatively, in some implementations, setting 261 may include one or more of an indication of a maximum power consumption limit (e.g., 23 W) or an indication of a specific +12V supply current setting for a storage device that results in the maximum power consumption limit being adhered to.

Figure 2E:
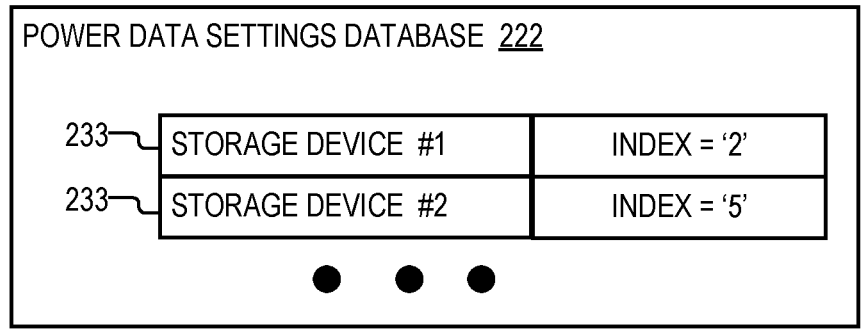
FIG. 2E is a diagram of an example of a power settings database, according to aspects of the disclosure.
Figure 2F:
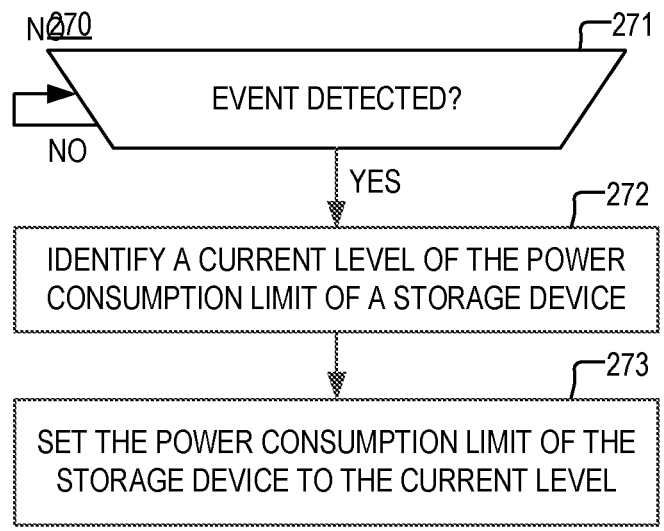
FIG. 2F is a flowchart of an example of a process, according to aspects of the disclosure.

FIG. 2E is a diagram of a database 222, according to aspects of the disclosure, according to aspects of the disclosure. Database 222 may include a plurality of entries 233. Each of entries 233 may correspond to a different one of storage devices 114. Each of the entries 233 may include an identifier of its corresponding storage device 114 as well as the current power limit index of the storage device. The current power limit index of the storage device is the power limit index of one of the data structures in database 223 that is currently used to set the maximum power consumption limit of that storage device 114. In other words, database 222 may used to determine the current power consumption limit of the storage devices 114. In implementations in which the storage devices 114 can be queried for their power consumption limits, database 222 could be omitted.

FIG. 2G is a diagram of an example of a process 270 that is performed by power manager 212. At step 271 power manager determines whether an event is detected that is generated when a storage device is restarted and/or when a system that is connected to a storage device enters startup mode (e.g., following a shutdown of the system due to the loss of power or for some other reason). If the event is detected, process 270 proceeds to step 272. Otherwise, step 271 is repeated. At step 272, power manager 212 identifies the current power consumption limit of the storage device. Specifically, power manager 212 retrieves the power limit index value that is associated with the storage device by database 222. Afterwards, power manager 212 retrieves from database 222 the power data structure having the same power limit index. The retrieved data structure may be the same or similar to power data structure 260 (shown in FIG. 2D), and it may specify a startup power limit and a normal operation power limit. At step 273, the maximum power consumption limit of the storage device is set based on the retrieved data structure. For example, if the storage device has not finished starting up, power manager 212 may first set the maximum power consumption limit to the value that corresponds to startup mode (e.g., setting 262), and then, after the storage device has finished starting up, power manager 212 may set the maximum power consumption limit to the value that corresponds to the normal operating mode (e.g., setting 261).

Process 270 describes a set of steps that may be executed when a storage device is restarted or when a storage system connected to the storage device is restarted. Process 270 may be used to set storage devices to a higher power consumption limit during system startup so that the startup could be completed faster (e.g., see FIG. 5). The switch from the startup power consumption limit to the normal operating mode power consumption limit may be driven by events that are generated when specific tasks associated with the startup of a system are completed. When a new device is installed, a default power limit index may be assigned to the new device, and the power consumption limit may be set in accordance with the default power limit index. Also, a new entry may be added to database 223 that corresponds to the new device. In some implementations, the power consumption limits of all (or more than one) storage devices 114 may be set at step 273 (instead of only one storage device).

In the example of FIG. 2E, the power consumption limits of storage devices 114 are set individually. However, in some limitations, the power consumption limit of storage devices 114 may be set as a group. In this case, all devices may have the same power consumption limit. When the power consumption limit is increased, it is increased for all of storage devices 114 by the same amount; and when the power consumption limit is reduced it is reduced for all of the storage devices 114 by the same amount. In instances in which the power consumption limit of storage devices 114 is set on a per-group basis, database 222 may include a single power consumption index that identifies the power data structure that contains the value of the current power consumption limit for the group. The phrase "setting the maximum power consumption limit of a storage device" may refer to one of "setting the maximum power consumption limit individually of the storage device" or "setting the maximum power consumption limit of each of the storage devices in a group to which the storage device belongs."

The phrase "power data structure" is used for ease of explanation to describe instances in which different power consumption limits are available for when a storage device is starting up and when the storage device is in normal operating mode. However, in some implementations, instead of a "power data structure" a single integer (or decimal) value may be used that specifies the maximum power consumption limit for the storage device (which is to be applied at all times or after the storage device has finished starting up).

As noted above, the power consumption limits in database 223 vary in increments of 1 W. The term "power limit index" may refer to any integer (or another value) that can be mapped to a corresponding power consumption limit by power manager 212. For example, the power limit index of a storage device may be the same as the power consumption limit of the storage device. In such implementations, a power consumption limit of 25 W may have the index of '25', a power consumption limit of 24 W may have the index of '24', a power consumption limit of 23 W may have the index of '23', and so forth. Stated succinctly, the "power limit index" may refer to a value that is representative of a power consumption limit, and which can be manipulated to increase or decrease the current power consumption limit of the storage device.

Furthermore, it will be understood that the present disclosure is not limited to the indexing scheme that is described with respect to databases 222 and 223. Those of ordinary skill in the art will readily recognize, after reading this disclosure, that various schemes can be devised to track the current power consumption limit of a storage device (i.e., the power consumption limit that is currently in effect) and/or other power consumption limits that can be possibly assumed by the storage device. The term "database" as used herein may refer to a set of one or more memory locations (contiguous or non-contiguous) that are used to store the described data. It will be understood that the present disclosure is not limited to any specific implementation of a database. A database may be a file, a data structure, a plurality of files, a plurality of data structures, an array, and/or any other memory location or set of memory locations that are used to store data.

Figure 3:
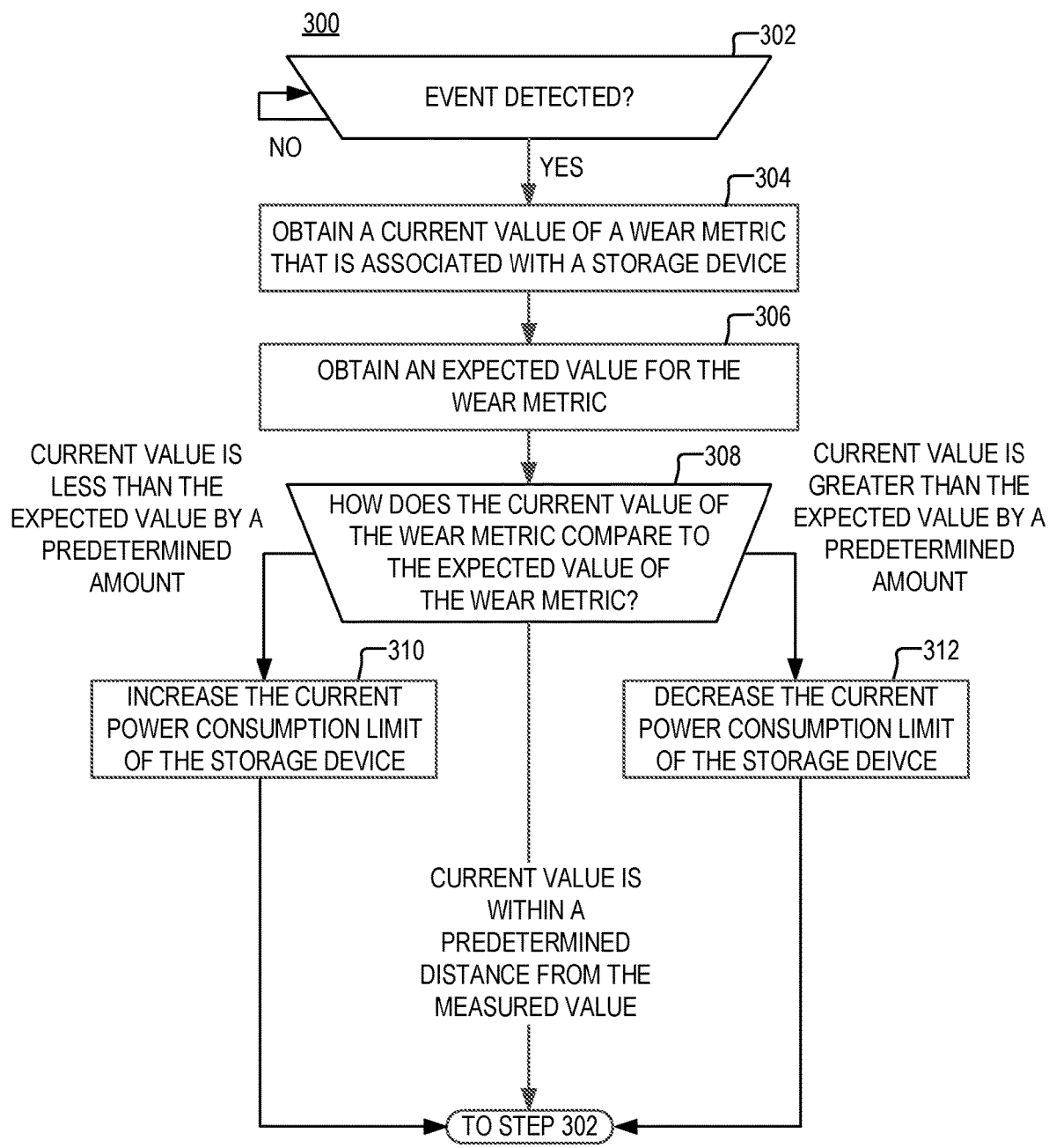
FIG. 3 is a flowchart of an example of a process, according to aspects of the disclosure.

FIG. 3 is a flowchart of an example of a process 300, according to aspects of the disclosure. According to the present example, process 300 is performed by the power manager 212. However, the present disclosure is not limited to any entity or set of entities performing the process 300.

At step 302, power manager 212 determines whether a predetermined event is detected. If the predetermined event is detected, process 300 proceeds to step 304. Otherwise, step 302 is repeated. The predetermined event may be a timer event that is generated periodically (e.g., every 5 minutes or every minute). However, it will be understood that the present disclosure is not limited to any specific type of event being detected or used.

At step 304, power manager 212 determines the current value of the wear metric for any of storage devices 114. According to the present disclosure, the wear metric is remaining percent life. However, alternative implementations are possible in which another wear metric used. The current value of the wear metric may be specific to one of storage devices 114 or it may be global to the entire group of storage devices. Under the nomenclature of the present disclosure, when the wear metric value is specific to one of storage devices 114, the wear metric value is one that is returned by the storage devices. Under the nomenclature of the present disclosure, when the wear metric value is global to the group of storage devices 114, the wear metric value may be one that is (i) calculated based on individual wear metric values that are returned by the storage devices 114 or (ii) determined by comparing wear metric values that are returned by different ones of storage devices 114. For instance, in one example, the wear metric may be the average remaining percent life of all of storage devices 114. In another example, the wear metric may be the smallest remaining percent life of any of storage devices 114. In yet another example, the wear metric may be the remaining percent life of a default one of storage devices 114 or one that is selected at random.

At step 306, the power manager 212 determines an expected value of the wear metric. According to the present example, the expected value is determined based on the expected wear curve 224. In one example, determining the expected value may include determining the current Unix time; subtracting the deployment time 225 from the current Unix time; using the resultant difference to index into the expected wear curve 224; and retrieving, as a result, an expected value of the wear metric that is mapped by the expected wear curve 224 to the resultant difference. When the expected wear curve is an equation, determining the expected value of the wear metric may include evaluating the equation based on the resulting difference. As can be readily appreciated, subtracting the deployment time 225 from the current Unix time yields the duration for which the storage devices 114 (or at least one of them) have been used.

At step 308, the power manager 212 compares the expected value of the wear metric (determined at step 304) to the actual value of the wear metric (determined at step 302). If the actual value is within predetermined bounds from the expected value, process 300 returns to step 302. If the actual value is less than the expected value by a predetermined amount, process 300 proceeds to step 310. If the actual value exceeds the expected value by at least a predetermined amount, process 300 proceeds to step 312.

At step 310 the maximum power consumption limit of storage devices 114 is stepped up. According to the present example, the maximum power consumption limit is increased by 1 W. However, alternative implementations are possible in which the maximum power consumption limit is increased by a different amount.

In some implementations, increasing the maximum power consumption limit may include: (i) identifying a current power limit index of the storage devices 114, (ii) incrementing the current power limit index, (iii) identifying a power consumption limit that corresponds to the incremented power limit index, (iv) generating an NVME power state descriptor that sets the power consumption limit to the level determined at step (iii), and (v) submitting the power state descriptor to each of the storage devices 114. In some implementations, the current power limit index may be retrieved from database 223. In some implementations, identifying the power consumption that corresponds to the incremented power limit index may include performing a search of database 223 to retrieve a power data structure (or just a maximum power consumption limit value). The maximum power consumption limit value may be the same or similar to the setting 261, which is discussed above with respect to FIG. 2D.

In some implementations, increasing the maximum power consumption limit may include: (i) identifying the current maximum power consumption limit of the storage devices 114 (or at least one of them), (ii) incrementing the current maximum power consumption limit by a predetermined amount (e.g., 1 W), (iii) generating an NVME power state descriptor that sets the power consumption limit to the level determined at step (ii), and (iv) submitting the power state descriptor to each of the storage devices 114. It will be understood that the present disclosure is not limited to any specific method for increasing the maximum power consumption limit of a storage device.

At step 312 the maximum power consumption limit of storage devices 114 is stepped down. According to the present example, the maximum power consumption limit is decreased by 1 W. However, alternative implementations are possible in which the maximum power consumption limit is decreased by a different amount.

In some implementations, decreasing the maximum power consumption limit may include: (i) identifying a current power limit index of the storage devices 114 (or at least one of them), (ii) decrementing the current power limit index, (iii) identifying a power consumption limit that corresponds to the decremented power limit index, (iv) generating an NVME power state descriptor that sets the power consumption limit to the level determined at step (iii), and (v) submitting the power state descriptor to each of the storage devices 114. In some implementations, the current power limit index may be retrieved from database 223. In some implementations, identifying the power consumption that corresponds to the decremented power limit index may include performing a search of database 223 to retrieve a power data structure (or just a maximum power consumption limit value). The maximum power consumption limit value may be the same or similar to the setting 261, which is discussed above with respect to FIG. 2D.

In some implementations, decreasing the maximum power consumption limit may include: (i) identifying the current maximum power consumption limit of the storage devices 114, (ii) decrementing the current maximum power consumption limit by a predetermined amount (e.g., 1 W), (iii) generating an NVME power state descriptor that sets the power consumption limit to the level determined at step (ii), and (iv) submitting the power state descriptor to each of the storage devices 114. It will be understood that the present disclosure is not limited to any specific method for decreasing the maximum power consumption limit of a storage device.

The example of FIG. 3 assumes that the maximum power consumption limit of the storage devices 114 is not at its largest possible value when step 312 is reached. If the maximum power consumption limit cannot be increased any further, when step 312 is reached, process 300 may return to step 302 directly without taking any action at step 312. The example of FIG. 3 assumes that the maximum power consumption limit of the storage devices 114 is not at its smallest possible value when step 310 is reached. If the maximum power consumption limit cannot be decreased any further, when step 310 is reached, process 300 may return to step 302 directly without taking any action at step 310. In the example of FIG. 3, the respective maximum power consumption limit of each of storage devices 114 is set when one of steps 310 and 312 is executed. However, in an alternative implementation, the maximum power consumption limit of a single one of storage devices 114 may be set at step 310 or step 312. This storage device 114 may be one whose wear metric is determined at step 302.

FIG. 4 shows a graph 400, which illustrates aspects of the operation of power manager 212. Shown in FIG. 4 is an expected wear curve 502, and a plurality of wear metric measurements, which are depicted as black circles. Circles that are labeled with the letter 'N' correspond to wear metric measurements that fall within predetermined bounds (denoted by dashed lines) from their corresponding expected values, and which do not trigger a change in the maximum power consumption limit of any (or all) of storage devices 114. Circles that are labeled with the letter 'H' correspond to wear metric measurements that exceed their corresponding expected values by at least a predetermined amount, and which trigger a decrease in the maximum power consumption limit of any (or all) of storage devices 114. Circles that are labeled with the letter 'L' correspond to wear metric measurements that fall short of their corresponding expected values by at least a predetermined amount, and which trigger an increase in the maximum power consumption limit of any (or all) of storage devices 114.

Figure 5:
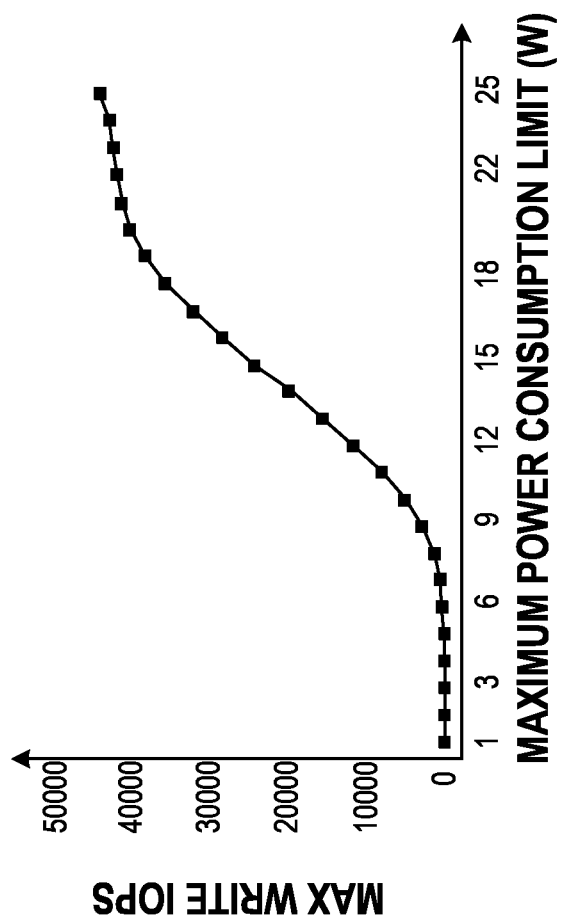
FIG. 5 is a graph illustrating the relationship between max IOPS and the maximum power consumption limit of a storage device, according to aspects of the disclosure.

FIG. 5 is a graph illustrating the relationship between the maximum power consumption limit of any of storage devices 114 and max write IOPS of that storage device. FIG. 5 illustrates, that the greater the maximum power consumption limit the greater the IOPS.

Any decreases in the max write IOPS of storage devices 114 that result from the execution of process 300 may masked by the caching of storage array 110. For example, decreasing the write IOPS of a storage device 114 may cause write data for that storage device to remain longer in the cache, during which time the write data may be overwritten with new data. When the write data is overwritten in the cache, an unnecessary write to the storage device may be avoided thus prolonging the life of the storage device. Consider an example of a burst of successive write to one of storage devices 114 that are performed in close temporal proximity, and which involve repeatedly overwriting the same logical address. In this example, when the maximum power consumption limit of the storage device is reduced, the data overwriting may take place in the cache rather than on the storage device, which in turn could reduce the wear experienced by the storage device.

FIGS. 1-5 are provided as an example only. In some embodiments, the term "I/O request" or simply "I/O" may be used to refer to an input or output request. In some embodiments, an I/O request may refer to a data read or write request. At least some of the steps discussed with respect to FIGS. 1-5 may be performed in parallel, in a different order, or altogether omitted. As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used throughout the disclosure, the phrase "within predetermined distance" may refer to a distance of '0' or a distance greater than zero. In the phrase "detecting whether a current value A is less than an expected value B by a first predetermined amount", the so-called first predetermined amount may be the minimum amount that takes for the expression (A<B) to evaluate to true. Alternatively, the predetermined amount can be greater. In the phrase "detecting whether a current value A is greater than an expected value B by a second predetermined amount", the so-called second predetermined amount may be the minimum amount that takes for the expression (A>B) to evaluate to true. Alternatively, the predetermined amount can be greater. The first and second predetermined amounts may have the same value or they can have different values. The values of the first and second predetermined amount may be selected to avoid excessive (or erratic) changes in the maximum power consumption limits of storage devices. Although some of the examples provided throughout the disclosure focus on QLC storage devices, it will be understood that the ideas and concepts presented throughout the disclosure can be applied to any type of storage device. In other words, the present disclosure is not limited to any specific type of storage devices.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

To the extent directional terms are used in the specification and claims (e.g., upper, lower, parallel, perpendicular, etc.), these terms are merely intended to assist in describing and claiming the invention and are not intended to limit the claims in any way. Such terms do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word "about", "substantially" or "approximately" preceded the value of the value or range.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

While the exemplary embodiments have been described with respect to processes of circuits, including possible implementation as a single integrated circuit, a multi-chip module, a single card, or a multi-card circuit pack, the described embodiments are not so limited. As would be apparent to one skilled in the art, various functions of circuit elements may also be implemented as processing blocks in a software program. Such software may be employed in, for example, a digital signal processor, micro-controller, or general-purpose computer.

Some embodiments might be implemented in the form of methods and apparatuses for practicing those methods. Described embodiments might also be implemented in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the claimed invention. Described embodiments might also be implemented in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the claimed invention. When implemented on a general-purpose processor, the program code segments combine with the processor to provide a unique device that operates analogously to specific logic circuits. Described embodiments might also be implemented in the form of a bitstream or other sequence of signal values electrically or optically transmitted through a medium, stored magnetic-field variations in a magnetic recording medium, etc., generated using a method and/or an apparatus of the claimed invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

Also, for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

It will be further understood that various changes in the details, materials, and arrangements of the parts which have been described and illustrated in order to explain the nature of the claimed invention might be made by those skilled in the art without departing from the scope of the following claims.

The invention claimed is:

1. A method, comprising:
   obtaining a current wear metric value that is associated with at least one storage device;

obtaining an expected wear metric value that corresponds to the current wear metric value;

comparing the current wear metric value to the expected wear metric value; and decreasing a maximum power consumption limit of the storage device from a current level to a first level that is lower than the current level, the maximum power consumption limit of the storage device being decreased in response to detecting that the current wear metric value exceeds the expected wear metric value by a first predetermined amount.

2. The method of claim 1, wherein decreasing the maximum power consumption limit of the storage device includes generating a Non-Volatile Memory Express (NVME) power state descriptor that indicates the first level and providing the power state descriptor to the storage device.

3. The method of claim 1, further comprising increasing the maximum power consumption limit of the storage device from the current level to a second level that is higher than the current level, the maximum power consumption limit of the storage device being increased in response to detecting that the current wear metric value falls short of the expected wear metric value by a second predetermined amount.

4. The method of claim 3, wherein decreasing the maximum power consumption limit of the storage device includes generating an NVME power state descriptor that indicates the second level and providing the NVME power state descriptor to the storage device.

5. The method of claim 1, further comprising leaving the maximum power consumption limit of the storage device unchanged in response to detecting that that the current wear metric value is within predetermined bounds from the expected wear metric value.

6. The method of claim 1, wherein the storage device is part of a group of storage devices, and the current wear metric value is global to the group.

7. The method of claim 1, wherein the expected wear metric value is obtained by identifying a duration for which the storage device has been deployed, and identifying a corresponding wear metric value that is mapped to the duration by an expected wear curve for the storage device.

8. The method of claim 1, wherein the current wear metric value is a current percentage life used value.

9. The method of claim 1, wherein the storage device is a quad-level cell (QLC) storage device or a penta-level cell (PLC) storage device.

10. A system, comprising:
a memory; and
at least one processor that is operatively coupled to the memory, the at least one processor being further configured to perform the operations of:
obtaining a current wear metric value that is associated with at least one storage device;
obtaining an expected wear metric value that corresponds to the current wear metric value;
comparing the current wear metric value to the expected wear metric value; and
decreasing a maximum power consumption limit of the storage device from a current level to a first level that is lower than the current level, the maximum power consumption limit of the storage device being decreased in response to detecting that the current wear metric value exceeds the expected wear metric value by a first predetermined amount.

11. The system of claim 10, wherein decreasing the maximum power consumption limit of the storage device includes generating a Non-Volatile Memory Express (NVME) power state descriptor that indicates the first level and providing the power state descriptor to the storage device.

12. The system of claim 10, wherein the at least one processor is further configured to perform the operation of increasing the maximum power consumption limit of the storage device from the current level to a second level that is higher than the current level, the maximum power consumption limit of the storage device being increased in response to detecting that the current wear metric value falls short of the expected wear metric value by a second predetermined amount.

13. The system of claim 12, wherein decreasing the maximum power consumption limit of the storage device includes generating an NVME power state descriptor that indicates the second level and providing the NVME power state descriptor to the storage device.

14. The system of claim 10, wherein the at least one processor is further configured to leave the maximum power consumption limit of the storage device unchanged in response to detecting that that the current wear metric value is within predetermined bounds from the expected wear metric value.

15. The system of claim 10, wherein the storage device is part of a group of storage devices, and the current wear metric value is global to the group.

16. The system of claim 10, wherein the expected wear metric value is obtained by identifying a duration for which the storage device has been deployed, and identifying a corresponding wear metric value that is mapped to the duration by an expected wear curve for the storage device.

17. The system of claim 10, wherein the current wear metric value is a current percentage life used value.

18. The system of claim 10, wherein the storage device is a quad-level cell (QLC) storage device or a penta-level cell (PLC) storage device.

19. A non-transitory computer readable medium storing one or more processor-executable instructions, which when executed by at least one processor, cause the at least one processor to perform the operations of:
obtaining a current wear metric value that is associated with at least one storage device;
obtaining an expected wear metric value that corresponds to the current wear metric value;
comparing the current wear metric value to the expected wear metric value; and
decreasing a maximum power consumption limit of the storage device from a current level to a first level that is lower than the current level, the maximum power consumption limit of the storage device being decreased in response to detecting that the current wear metric value exceeds the expected wear metric value by a first predetermined amount.

20. The non-transitory computer-readable medium of claim 19, wherein decreasing the maximum power consumption limit of the storage device includes generating a Non-Volatile Memory Express (NVME) power state descriptor that indicates the first level and providing the power state descriptor to the storage device.

* * * * *